United States Patent [19]
Calkin et al.

[11] 3,745,444
[45] July 10, 1973

[54] SWITCHING REGULATOR WITH NETWORK TO REDUCE TURNON POWER LOSSES IN THE SWITCHING TRANSISTOR

[75] Inventors: Edwin Theodore Calkin, Parsippany; Billy Harold Hamilton, Summit; Frank Carl La Porta, Livingston, all of N.J.

[73] Assignee: Bell Telephone Laboratories, Inc., Murray Hill, N.J.

[22] Filed: Mar. 22, 1972

[21] Appl. No.: 236,852

[52] U.S. Cl. ............................ 323/17, 321/2, 323/9, 323/22 T, 323/DIG. 1
[51] Int. Cl. ............................................ H02m 3/32
[58] Field of Search ...................... 321/2; 323/9, 17, 323/22 T, DIG. 1

[56] References Cited
UNITED STATES PATENTS

| 3,383,584 | 5/1968 | Atherton | 323/DIG. 1 |
| 3,600,666 | 8/1971 | Gliever | 323/DIG. 1 |
| 3,566,253 | 2/1971 | O'Neill | 323/DIG. 1 |
| 3,641,422 | 2/1972 | Farnsworth et al. | 323/DIG. 1 |
| 3,621,372 | 11/1971 | Paine | 323/DIG. 1 |
| 3,663,949 | 5/1972 | Froeschle | 323/DIG. 1 |

Primary Examiner—A. D. Pellinen
Attorney—W. L. Keefauver et al.

[57] ABSTRACT

Power dissipation losses occur during the turnon transition period of the switching transistor of a switching regulator. These losses are due to the voltage appearing across the switching transistor during current conduction within the turnon transition period. A turnon loss reduction network is added to the switching regulator to reduce the power dissipation in the switching transistor during turnon. This turnon loss reduction network counteracts the voltage normally appearing across the switching transistor and hence reduces the power dissipation therein due to this voltage. A lossless charging arrangement is included in the regulator to reduce the power dissipation that occurs within the turnon loss reduction network.

3 Claims, 8 Drawing Figures

FIG. 1
(PRIOR ART)
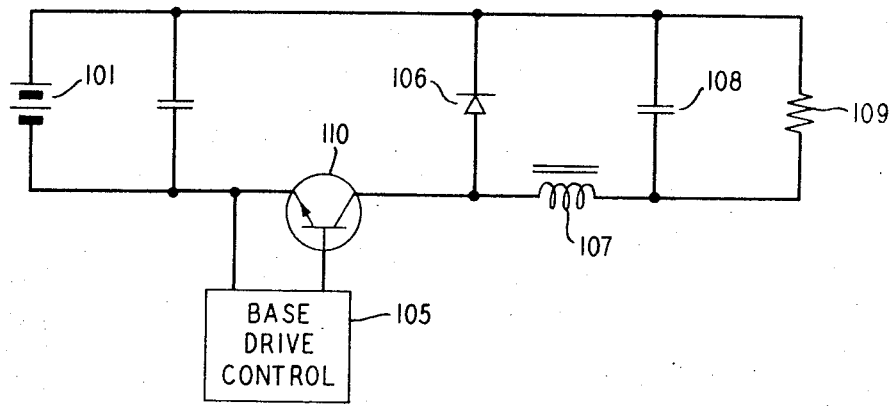
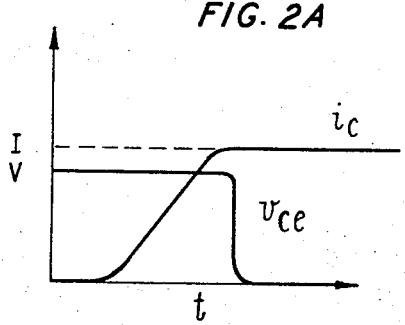
FIG. 2A
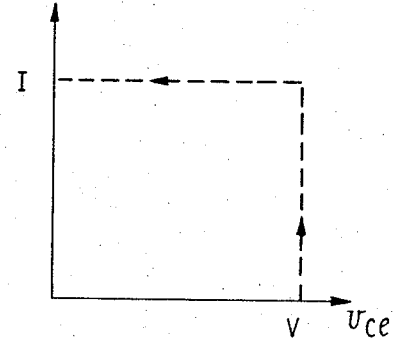
FIG. 2B
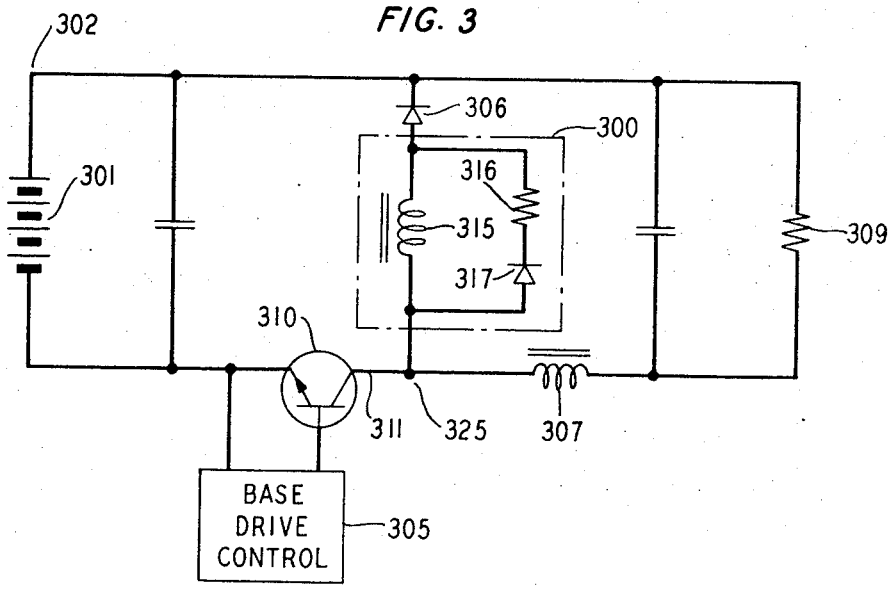
FIG. 3

SWITCHING REGULATOR WITH NETWORK TO REDUCE TURNON POWER LOSSES IN THE SWITCHING TRANSISTOR

BACKGROUND OF THE INVENTION

This invention relates to power supplies and more specifically to switching mode regulators. It is specifically concerned with the reduction of switching losses occurring in the switching device of the switching regulator.

A typical switching mode regulator such as is shown in FIG. 1 utilizes a transistor switch 110 to intermittently couple a voltage source 101 to an output load 109. The voltage level at the output load 109 is determined by the duration that the switching transistor 110 conducts within each cycle of operation. The switching of the switching transistor 110 is controlled by a base drive control circuit 105. This base drive control circuit 105 may comprise circuitry either external or internal to the switching regulator. It may be responsive to either the current or voltage output of the regulator or to both of these quantities. Regulation feedback circuits to accomplish this switching control are well known to those skilled in the power supply art and, hence, it is not believed necessary to describe it in detail.

The current transmitted by the switching transistor 110 is coupled to the load 109 via a flyback inductor 107. The current inertia characteristics of the flyback inductor 107 stabilizes the output current of the regulator. When the transistor switch 110 is biased nonconducting, the stored energy in the flyback inductor 107 supplies the current to the load 109. It provides this current to the load 109 via a flyback diode 106. A capacitor 108 shunting the output load also supplies current by discharging during this interval.

The transistor switch 110, when conducting, is operated in a saturated mode. Since the voltage drop across the transistor 110 is very small during saturation, very little power is dissipated therein. Power, however, is dissipated in the transistor 110 during the transition periods from its nonconducting to its conducting state. The current and voltage response of the switching transistor 110 during this turnon transition period is shown by the current and voltage waveforms of FIG. 2A. As is apparent from the waveforms shown in FIG. 2A, as the transistor switch 110 is biased into its conducting state, the collector current $i_c$ slowly increases from a zero value to the saturated current value I in a linear ramp-type fashion. As is apparent from the voltage waveform $v_{ce}$, the voltage drop across the collector-emitter path of transistor 110 remains at nearly the cut-off value V until the current reaches the saturated value I. The power loss in the switching transistor 110 during the time when the current is increasing from zero to its saturated value I may dissipate a considerable portion of the input power applied to the regulator. The current and voltage response of the transistor 110 may be readily ascertained by reference to FIG. 2B which indicates that the voltage across the transistor 110 remains at approximately its maximum value V until the saturated current level I in the collector-emitter path of the transistor is achieved. This power loss during the turnon may require the use of a switching transistor having a very high power dissipation capacity together with a large heat sink device.

It is, therefore, an object of the invention to significantly reduce turnon loss in the switching transistor of a switching regulator.

It is also an object to reduce power dissipation losses generally in a switching regulator.

It is yet another object to improve the efficiency of operation of switching transistors in a switching regulator and permit their utilization at their rated capacity.

SUMMARY OF THE INVENTION

Therefore, in accord with the invention, a turnon loss reduction network is included in a switching regulator to reduce the turnon power losses in its switching transistor. The turnon loss reduction network includes a compensating inductor which is connected to the flyback diode of the regulator. During the turnon transition of the switching transistor, while the flyback diode is still forward biased, the compensating inductor generates a voltage which is equal to the input voltage supplied to the regulator. This induced voltage is utilized to absorb the input voltage rather than permitting it to appear across the terminals of the switching transistor during the turnon transition period thereby reducing energy dissipation in the transistor due to current flow during this transition time. The energy stored in the compensating inductor, just prior to the turnon of the switching transistor, is discharged into the output load during the turnon transition period of the switching transistor.

The charging of the compensating inductor prior to this turnon loss reduction operation consumes energy since the compensating inductor is dissipatedly charged. Added circuitry is included in this turnon loss reduction network to eliminate the charging losses by losslessly charging the compensating inductor. A feature of this invention is the monitoring of current flowing through this lossless charging path to provide overcurrent protection of the switching regulator output.

BRIEF DESCRIPTION OF THE DRAWINGS

Many additional features, advantages and other objects of the invention will become apparent upon consideration of the following detailed description of a specific switching type regulator loss reduction network utilizing the principles of the invention. The following description is to be taken in conjunction with the attached drawings in which:

FIG. 1 is a schematic of a switching regulator of the prior art which is described hereinabove;

FIGS. 2A and 2B disclose signal waveforms and switching loci to illustrate the signal response characteristic of the switching transistor of the regulator shown in FIG. 1 during the turnon transition period;

FIG. 3 is a schematic of a switching regulator including a turnon loss reduction network to reduce the turnon losses in the switching transistor of a switching regulator;

DETAILED DESCRIPTION

Figure 4A:
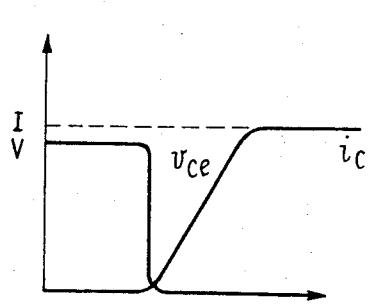
FIGS. 4A and 4B comprise signal waveforms and switching loci to illustrate the signal response characteristics of the switching transistor of the switching regulator shown in FIG. 3 during the turnon transition period.

The switching regulator disclosed in FIG. 3 intermittently couples a voltage source 301 to an output load 309 by intermittently switching the switching transistor 310 into alternate conducting and nonconducting states. The circuit operates identically to the circuit described above with reference to FIG. 1 and hence need not be described in detail. The turnon losses in the switching transistor 310, however, are significantly reduced by a turnon loss reduction network 300 included in the circuit. The turnon loss reduction network 300 comprises a compensating inductor 315 connected in series with the flyback diode 306. The compensating inductor 315 interconnects the flyback diode 306 to a junction 325 at which the collector electrode 311 is connected to the flyback inductor 307. A charging network comprising a series-connected diode 317 and charging resistor 316 shunts the compensating inductor 315.

An understanding of the turnon loss reduction network 300 may be readily acquired by describing its operation during the turnon transition period of the switching transistor 310. Just prior to the turnon of the switching transistor 310 a voltage approximately equal to the input voltage of the source 301 exists across the collector-emitter electrodes of the switching transistor 310. The current to the output load 309 is sustained by the flyback inductor 307. This current flows through the compensating inductor 315 and the diode 306. As the base drive control 305 biases the switching transistor 310 into conduction, the current in the flyback diode 306 begins to decrease. Hence, the current flowing through the compensating inductor 315 begins to decrease. The compensating inductor 315 attempts to sustain the current at the same level which had been flowing through it just an instant before. Hence a large voltage is induced across the inductor 315. This voltage is equal in magnitude and opposite in phase to the voltage of the input voltage source 301. It is apparent that at this point only a very low voltage appears across the collector-emitter terminals of the switching transistor 310. Hence the collector-emitter voltage of transistor 310 is reduced to a very low value during the time period when current begins to flow through the transistor 310 and increases to its saturated value I.

Figure 4B:
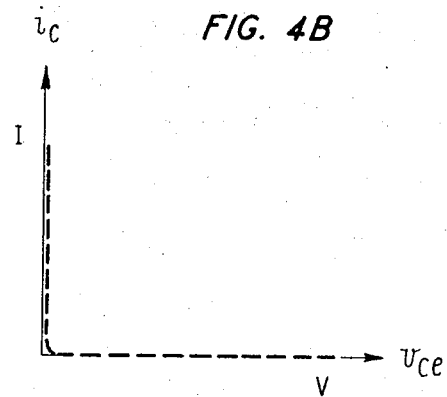

The foregoing may be readily ascertained by reference to FIG. 4A where it is apparent that the collector-emitter voltage $v_{ce}$ of the switching transistor 310 drops to a very low value as current conduction begins. The colector-emitter voltage $v_{ce}$ drops almost immediately to a very low value and the collector current $i_c$ of the switching transistor 310 increases to its saturated value I with a very low voltage drop appearing across the collector-emitter terminals of the switching transistor 310. The switching loci is shown in FIG. 4B wherein the power dissipated during switching is represented by the area under the curve locus in FIG. 4B. The improved efficiency becomes apparent when this area is compared with the area under the curve locus in FIG. 2B.

Energy is stored in the inductor 315 during the turnoff transistion period of the switching transistor 310. This energy is supplied by a charging voltage which appears as a result of a charging current flow through the diode 317 and the charging resistor 316 as the transistor 310 turns off. The energy dissipated in the charging resistor 316 during turnoff may represent a considerable portion of the power saved during the turnon transition period in transistor 310. In instances where circuit efficiency is very important and where heat dissipation represents a problem, it is desirable to eliminate this power loss in the charging resistor 316.

Figure 5:
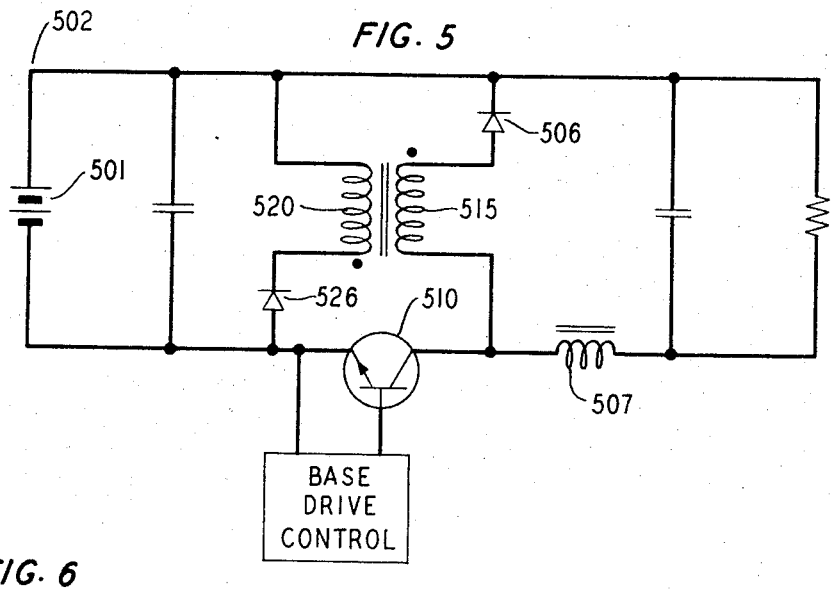
FIG. 5 is a schematic of a switching regulator with a lossless charging arrangement to charge the turnon loss reduction network.

This power dissipation in the charging resistor 316 may be eliminated by eliminating the charging resistor 316 and substituting in its place a lossless charging network. In FIG. 5 the turnon loss reduction network is modified to permit lossless charging of the compensating inductor 515. The lossless charging network comprises an additional charging inductor winding 520 which is wound on the core of the inductor 515. This charging inductor winding 520 is directly connected across the input voltage source 501 through diode 526. As current flows through the flyback diode 506, the current flowing in the charging inductor winding 520 is initially at a value proportional to the output load current. This initial value is dependent upon the turns ratio between the charging inductor winding 520 and the winding of the compensating inductor 515.

The compensating inductor 515 is charged by the charging inductor winding 520 at a constant voltage which is equal to the input voltage of the voltage source 501. This permits a rapid and uniform charging of the compensating inductor 515. A diode 526 is connected in series with the charging inductor winding 520 and poled to prevent reverse current flow through winding 520 due to the input voltage source 501.

Figure 6:
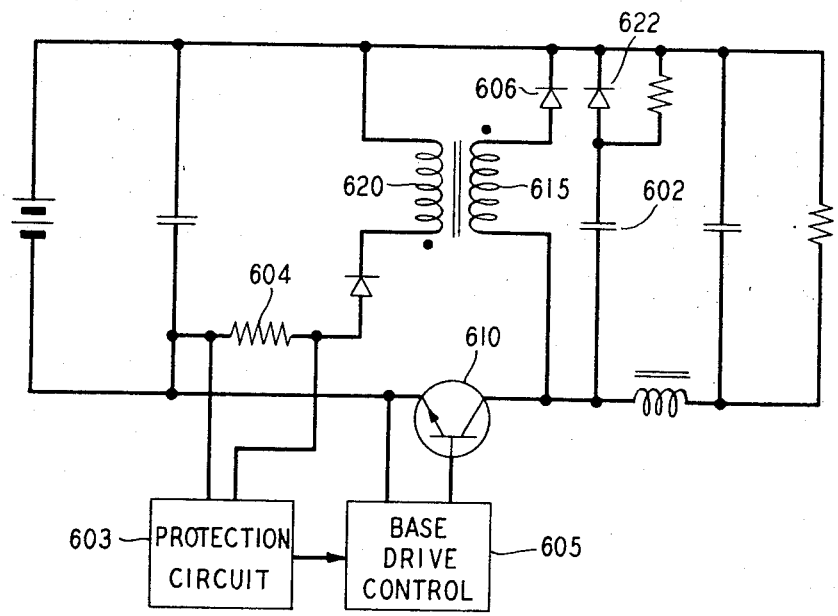
FIG. 6 is a schematic of a switching regulator utilizing the characteristics of the turnon loss reduction network to provide overcurrent protection.

The current flowing through the charging inductor winding 520, as indicated above, is proportional to the load current at the instant of turnon of the switching transistor 510. An overcurrent protection circuit is shown in FIG. 6 to utilize this proportional current to control an overcurrent protection circuit. This proportional current is used to operate a protection circuit 603 to prevent the occurrence of overcurrent in the switching transistor 610. To operate this overcurrent protection circuit 603 a current sensing resistor 604 is placed in series with the charging inductor winding 620. The overcurrent protection circuit 603 has a current level detector which is connected in shunt with the resistor 604. The protection circuit 603 in response to the occurrence of an overcurrent applies a signal to the base drive control 605 to turn off the switching transistor 610.

The switching regulator in FIG. 6 includes a series connected capacitor 602 and diode 622 which shunt the flyback diode 606 and the inductor 615. This circuit comprises a turnoff loss reduction network which is described in detail in applicants' copending application, filed Mar. 22, 1972 Ser. No. 236,833 and assigned to the same assignee. The turnoff loss reduction network is disclosed herein to describe its function in countering certain adverse effects of the turnon loss reduction network during the turnoff of the switching transistor 610.

Referring again to FIG. 5, as the switching transistor 510 turns off, the induced voltage of the flyback inductor 507 attempts to sustain the load current which the switching transistor 510 was conducting. Since the switching transistor 510 is now becoming nonconducting, this load current must flow through the compensating inductor 515 and the flyback diode 506 to the load. The compensating inductor 515 generates an induced voltage which opposes this current flow and which is in phase with the voltage of the input voltage source 501.

The induced voltage is limited to a value proportional to the input voltage source and the turns ratio between the compensating inductor 515 and the charging inductor winding 520. The combined voltage of the input voltage source 501 and the compensating inductor 515 applies a voltage across the collector-emitter path of the switching transistor 510 which exceeds the voltage of the input source. This voltage which appears during turnoff while collector current is still decreasing causes a power dissipation which may overstress the switching transistor 510. The addition of the capacitor 602 to the circuit of FIG. 6 constrains the collector voltage of the switching transistor 610 to increase gradually as it turns off. This is due to the linearly increasing discharge current of the capacitor 602 during the turnoff transition time of the transistor 610. The resultant gradual rise of the collector voltage of transistor 610 as its collector current decreases results in a greatly reduced power dissipation in the switching transistor 610.

What is claimed is:

1. A switching type regulator comprising input terminals, output terminals, a first series connection including a switching transistor and a flyback inductor coupling one of said input terminals to one of said output terminals, a common junction coupling said transistor and said flyback inductor, a second series connection including a second inductor and a flyback diode, said second series connection being connected to said junction coupling said switching transistor and said flyback inductor and to the other ones of said input and output terminals, wherein the improvement comprises, a third inductor winding and a second diode connected as a third series connection, said third series connection connected in shunt across said input terminals, said third inductor winding being magnetically coupled to said second inductor and said second diode being poled to conduct in response to induced signals in said third inductor when said flyback diode is conducting.

2. A switching regulator as defined in claim 1 further including a fourth series connection including a third diode and a capacitor shunting said second series connection wherein said capacitor discharges during the turnoff of said switching transistor to limit the voltage rise across said switching transistor.

3. A regulating circuit including an input circuit, a switching transistor intermittently driven into alternately conducting and nonconducting states, an output circuit including a flyback inductor and a flyback diode to supply current during the nonconducting state of said switching transistor, means to eliminate a voltage drop across said switching transistor during its transition from a nonconducting to a conducting state including a compensating inductor connected between said flyback diode and said flyback inductor, the connection of said flyback inductor and said compensating inductor being connected to the collector of said switching transistor, wherein the improvement comprises, means to store energy in said compensating inductor during the nonconducting state of said switching transistor comprising a charging inductor winding shunting said input circuit and magnetically coupled to said compensating inductor, whereby a reverse voltage induced in said compensating inductor as said switching transistor switches from a nonconducting to a conducting state counteracts the voltage drop across said switching transistor, and said charging inductor permits lossless charging of said compensating inductor. of said switching transistor, wherein the improvement comprises, means to store energy in said compensating inductor during the nonconducting state of said switching transistor comprising a charging inductor winding shunting said input circuit and magnetically coupled to said compensating inductor, whereby a reverse voltage induced in said compensating inductor as said switching transistor switches from a nonconducting to a conducting state counteracts the voltage drops across said switching transistor, and said charging inductor permits lossless charging of said compensating inductor.

* * * * *

UNITED STATES PATENT OFFICE
CERTIFICATE OF CORRECTION

Patent No. 3,745,444     Dated July 10, 1973

Inventor(s) EDWIN THEODORE CALKIN, ET. AL.

It is certified that error appears in the above-identified patent and that said Letters Patent are hereby corrected as shown below:

In the Abstract, line 7, "inthe" should read -- in the -- . Column 6, line 28, after the period, "of said" through line 39 should be cancelled.

Signed and sealed this 22nd day of January 1974.

(SEAL)
Attest:

EDWARD M. FLETCHER, JR.  
Attesting Officer

RENE D. TEGTMEYER  
Acting Commissioner of Patents